Patented Jan. 12, 1954

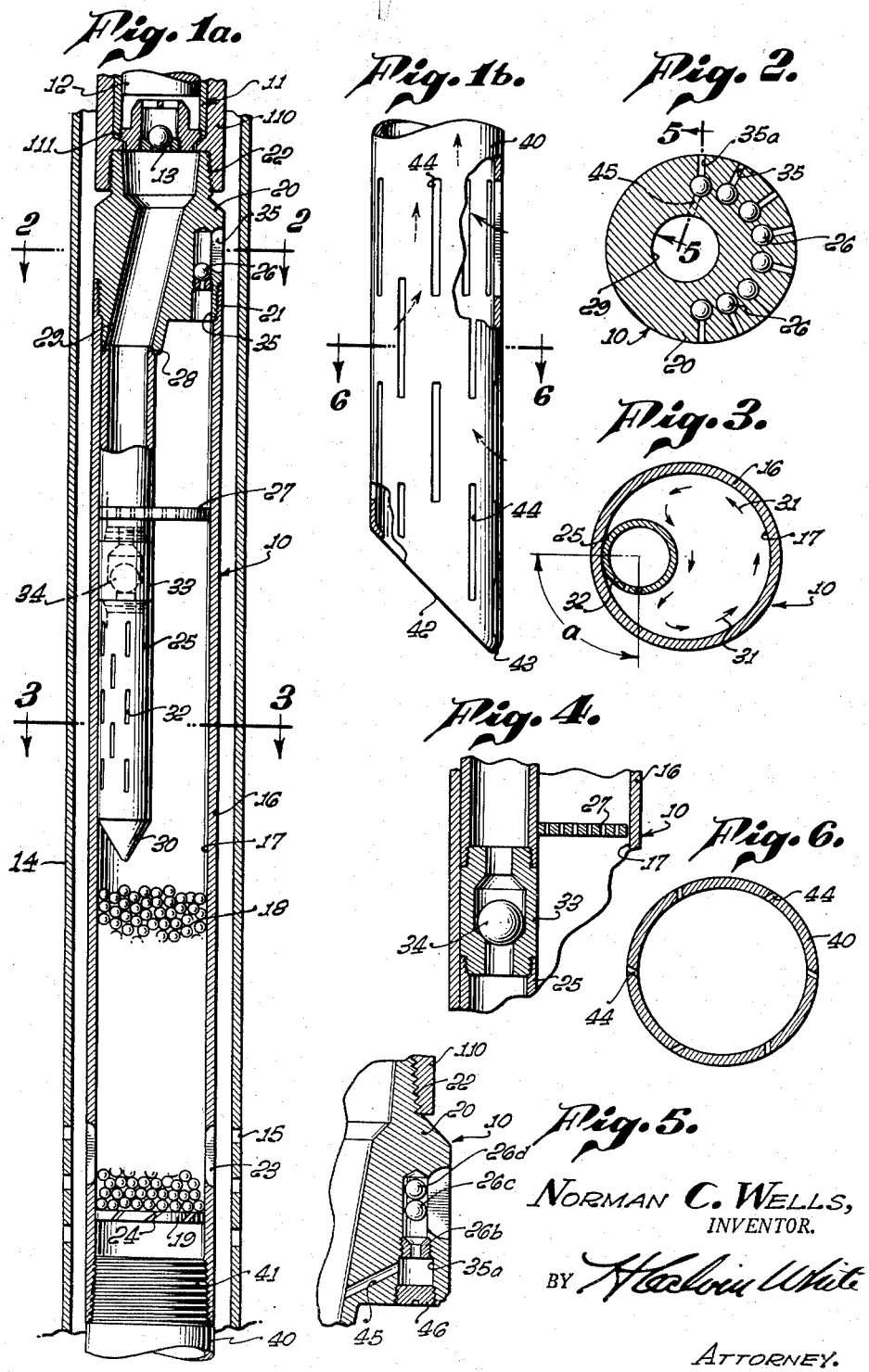

2,665,645

UNITED STATES PATENT OFFICE 2,665,645

WELL PUMP GAS AND SAND CONTROL FILTER

Norman C. Wells, Long Beach, Calif., assignor to Agate Corporation, Los Angeles, Calif., a corporation of California Application January 25, 1952, Serial No. 268,259

17 Claims. (Cl. 103—203)

This invention relates to improved well pump filter attachments for controlling the flow of materials carried in the well liquid flowing toward a pump. More specifically, the present devices may be capable of either or both separating gases from the well liquid, or controlling the rate at which sand or other solids carried in the liquid pass to the pump. Certain features of the present filters have been shown and claimed in patent No. 2,525,897 issued to Haskell M. Greene on Well Pipe Filters, as well as in application Ser. No. 207,627 on Well Pump Filter Attachments, filed January 24, 1951 by Mr. Greene, and in my copending application Ser. No. 268,258 on Well Pump Filters, of even date herewith.

The filters contemplated by this invention are of a type comprising a body connectable to the lower suction end of a well pump, and filter means contained within a chamber in the body in the path of fluid flowing to the pump. For discharging the well liquid from the filter chamber to the pump, the device includes a liquid outlet tube extending downwardly into the filter chamber from its upper end and containing a passage leading upwardly to the pump.

The present invention is concerned particularly with certain structural improvements in devices of the above character, which improvements have proven of considerable importance in assuring a most effective filtering action. For one thing, I have attained maximum freedom of fluid flow through the filter chamber by a unique positioning of the liquid outlet tube, in a manner minimizing interference by the tube with the fluid flow. Specifically, it has been found desirable to position the liquid outlet tube in the chamber at a location offset horizontally from the center of the chamber. Preferably, the tube is positioned directly against and extends vertically along a side of the chamber, to thus form a relatively wide fluid flow area between the tube and an opposite side of the chamber.

In certain of the disclosures of the above mentioned patent and applications, the filtering material which is employed comprises a mobile mass of interengaging filter particles, preferably glass spheres, adapted to be displaced upwardly within the filter chamber by each surge of well fluid toward the pump. When such movable filter materials are employed, the above discussed offset positioning of the liquid outlet tube becomes especially important, since it increases the freedom of movement of not only the well fluid, but also the upwardly moving filter particles or spheres.

In the devices of Greene application Ser. No. 207,627, the well fluid and filter particles, as they move upwardly within the chamber, are directed in a highly effective circular or upwardly spiraling course of flow. When an offset liquid outlet tube is used in such devices, additional advantages can be obtained by specially forming the tube to take liquid from only a predetermined relatively undisturbed area of the chamber. Specifically, the tube may be designed to receive liquid from only a side thereof located downstream with respect to the circular course of the spiralling materials. Such formation of the tube aids especially in preventing the carryover of gases into the pump with the well liquid.

A further object of the invention is to provide means in the filter device for assuring effective priming of the well pump with liquid upon each of its suction or up strokes. This result is achieved by the employment in the liquid outlet tube of a check valve acting to prevent downflow of fluid from the tube during the pump downstroke, and thus maintain a charge of liquid in the pump suction line at all times. At the same time, I may provide means for by-passing liquid about this check valve and downwardly from the production string of tubing to the outside of the filter body upon unseating of the pump within the string preparatory to raising of the string.

In my copending application Ser. No. 268,258, I have disclosed and claimed means for continuously maintaining a liquid seal in a gas separator of the present type, acting to prevent the flow of any of the separated gases to the pump. Preferably, the devices of the present invention include this unique liquid sealing feature, in combination with those discussed above.

The above and other features of the present invention will be better understood from the following detailed description of the typical embodiment illustrated in the accompanying drawing, in which:

Figs. 1a and 1b comprise together a vertical sectional view through a well pump filter attachment embodying the invention, Fig. 1b being a lower continuation of Fig. 1a;

Fig. 2 is an enlarged horizontal section through the upper fluid discharging head of the device, taken on line 2—2 of Fig. 1;

Fig. 3 is an enlarged horizontal section taken on line 3—3 of Fig. 1;

Fig. 4 is an enlarged fragmentary vertical section through the liquid outlet tube and its contained check valve;

Fig. 5 is an enlarged fragmentary vertical section taken on line 5—5 of Fig. 2; and Fig. 6 is a horizontal section through the lower inlet portion of the device, taken on line 6—6 of Fig. 1b.

Referring first to Fig. 1, a preferred form of filter 10 embodying the invention is there shown connected to the lower end of a production string 110 containing a conventional well pump 11. The pump, which is only partially illustrated, seats downwardly against an annular seat 111 within the string 110, and includes the usual vertically reciprocating piston 12, and a lower fluid inlet check valve 13. The pump and filter device are shown positioned within a well casing 14, containing perforations 15 through which well fluid may flow from the formation surrounding the casing into the well. The casing 14 normally contains a hydrostatic column of the well liquid extending upwardly to a location high above the pump.

The filter device 10 includes a tubular vertically extending main body section 16, which serves as the side wall of an inner filter chamber 17, containing the filter mass 18. The lower end of chamber 17 is defined by a bottom wall or partition 19 extending transversely across main body section 16; and the upper end of the chamber is defined by an upper head 20, threadedly connected to body section 16 at 21, and to the pump at 22. Liquid and gaseous well fluid enters the lower portion of the filter chamber through side and bottom inlets 23 and 24. After the separation of liquid and gas within the chamber, the liquid leaves the chamber through outlet tube 25 leading to the pump, and the separated gases are discharged to the exterior of the filter body past check valves 26 in head 20.

Side inlets 23 are formed as a number of vertically elongated circularly spaced fluid passing slots in the lower portion of tubular body section 16. Bottom inlets 24 comprise a number of circularly spaced slots formed in, and extending radially outwardly from near the center of, chamber bottom wall 19. The inlets 23 and 24 all extend angularly through the chamber walls in which they are formed, to direct the incoming well fluid generally tangentially into chamber 17, and cause a circular and upwardly spiraling motion of the well fluid in the chamber.

I find it desirable to connect to the lower end of the filter body 16 a bottom fluid inlet member 40, acting to impart to the fluid moving toward inlets 24 an initial swirling motion, and to effect a separation of some of the sand from the fluid prior to entry of the fluid into the filter chamber. This member 40 is tubular as shown, and extends vertically from an upper end 41 threadedly connected to body 16, to an open lower end 42. The lower end 42 of member 40 is preferably cut off angularly, that is, in a plane inclined to the horizontal. The bottom edge portion of member 40 may be curved inwardly, as shown at 43 in Fig. 1b, to present a rounded surface adapted to move downwardly past irregularities on the well casing, as the tool is lowered into a well, without being caught on those irregularities. The side wall of tubular member 40 contains a number of vertically elongated inlet slots 44, through which fluid enters member 40 for passage upwardly into the filter chamber. Slots 40 extend angularly or generally tangentially through the wall of member 40 (see Fig. 6), to direct the incoming fluid in an upwardly spiraling course of flow as it moves toward the filter chamber. Inlets 44 direct fluid in the same circular direction as the filter chamber inlets 23 and 24, and thus increase the spiraling motion within the filter chamber. Also, the spiraling motion of the fluid within member 40 acts to effect an initial separation of some of the sand from the fluid, to fall downwardly through the open lower end 42 of member 40 and back into the well. It is contemplated that when inlet member 40 is connected to the lower end of the filter body, the side inlets 23 to the filter chamber may be eliminated, so that all fluid flowing to the filter chamber must pass through the inlet member.

The filter material 18 is initially received within the lower portion of chamber 17, and comprises a mobile and vertically displaceable mass of discrete and interengaging filter particles. For best results, these filter particles should take the form of glass spheres, preferably of a diameter between about $\frac{3}{16}$ inch and ½ inch. Upon each upstroke of the pump piston, the resulting circular and upwardly spiraling flow of well fluid within chamber 17 causes a corresponding circular and upwardly spiraling motion of the filter particles or spheres, as well as a spinning motion of the spheres about their individual axes. Such upward spiraling motion of the spheres is limited by their engagement with a perforated transverse partition 27 received between liquid outlet tube 25 and chamber side wall 16 at a location spaced beneath the top of the chamber.

As the well fluid flows upwardly through the filter mass 18, contact of the fluid with the filter particles causes separation of the gases from the well liquid, which separation is greatly enhanced by the violent spiraling and spinning motions of the particles. At the same time, the filter mass acts to control the amounts of sand and other entrained particles flowing to the pump with the well liquid. More particularly, the filter mass prevents passage to the pump at any time of sudden charges of sand or the like in quantities sufficient to materially damage the pump, but instead passes these solid materials to the pump at a relatively uniform and safe rate. When the flow of solid particles is thus regularized, these particles can be maintained in suspension with the well liquid during their entire passage through the pump, and the usual damage to the pump is avoided.

The liquid discharge tube 25 is threadedly connected to the underside of head 20 at 28, and communicates with passage 29 in the head leading upwardly to the pump. Tube 25 projects downwardly into chamber 17, and terminates in a tapered and closed lower end 30 located a short distance above the filter mass in its condition of repose. In order to provide a liquid and filter particle flow area of maximum horizontal dimension at one side of tube 25, the tube is positioned at a location offset horizontally from the center of chamber 17. Preferably, tube 25 is located directly against a side of the chamber, so that the upwardly spiraling fluid and filter particles may follow the extended and relatively free course represented by the arrows 31 in Fig. 3.

The well liquid enters liquid outlet tube 25 through a number of apertures 32 formed in the wall of the tube. The uppermost of these apertures is spaced a substantial distance below the gas outlet valves 26, so that the imperforate upper portion of tube 25 forms with head 30 and main body section 16 an enclosed upper gas receiving space.

In order to minimize the chances that any gases will flow with the liquid into the liquid outlet tube, the apertures 32 in that tube are so positioned as to take liquid from only the most calm and undisturbed portion of the chamber 17. Specifically, these apertures are located at a side of tube 25 which is downstream with respect to the circular course of fluid and filter particle flow within the chamber. Preferably, these apertures are formed in only the most removed portion of even that downstream side of the tube, specifically in an approximately 90° portion thereof nearest the body side wall and designated at "a" in Fig. 3.

To assure the delivery of a relatively dead body of liquid to the pump upon each upstroke, I preferably connect into the liquid outlet tube 25 a check valve unit 33. This unit includes a ball check valve element 34 adapted to pass liquid upwardly to the pump during its upstroke, but to prevent the downward flow of any of the liquid during the pump downstroke. For best results, the check valve unit should be connected into the outlet tube at a location directly above the uppermost tube aperture 32.

The separated gases escape from the upper portion of the chamber through a number of passages 35 in the head, each of which extends first upwardly from the top of the chamber and then laterally to the outside of the device. There may typically be seven of these passages, at locations spaced about a semi-circular extent of the head opposite the portion of the head from which liquid outlet tube 25 depends. A check valve 26 is positioned within the upwardly extending portion of each passage 35, to prevent reverse or inward fluid flow, and to regulate the outward flow.

Predetermination of the degree of loading of check valves 26, preferably by merely controlling their weights and their areas subjected to pressure, is of considerable importance in assuring most effective gas separation in the present device. For one thing, these check valves should be so designed as to resist opening movement to an extent at all times maintaining a body of unexpelled gas in the upper portion of the chamber. The presence of such a gas column above the liquid creates a liquid-gas interface in the chamber, which in accordance with known principles encourages a continuing separation of gas from the liquid.

The loading of check valves 26 is important also for controlling the liquid level within the filter chamber, in a manner preventing discharge of any gases to the pump with the well liquid. Specifically, the check valves should be loaded sufficiently lightly to under all circumstances maintain the liquid level in the chamber above the uppermost one of the liquid outlet apertures 32. In this way, a highly effective liquid seal is provided at the liquid outlets, positively preventing access of any of the separated gases to those outlets.

With specific reference to the manner in which check valves 26 control the liquid level in the chamber, it is noted that as gases accumulate in the upper portion of the chamber an unbalanced condition is set up between the hydrostatic columns at the inside and outside of the filter body. This unbalanced condition evidences itself in the exertion of a differential pressure tending to open check valves 26. As will be understood, this differential pressure is caused by the weight of an unbalanced portion of the outer liquid column horizontally opposite and corresponding in height to the inner gas column. The value of this differential pressure exerted against the valve may be calculated for any particular height of gas column from the following formula, assuming the weight of the inner gas column to be negligible:

$$P = H \times D$$

Where, $P$ = differential pressure in lbs. per square inch.
$H$ = height of gas column in feet.
$D$ = density of fluid in outer fluid column in lbs. per square inch per ft. of height of fluid column.

In designing a particular filter, it is necessary to so select the check valves and to so position the liquid outlets that the differential hydrostatic pressure, as calculated from the above formula, will reach a sufficient value to open the valves before the liquid level has fallen to the liquid outlet location. Stated differently, if both the maximum liquid density likely to be encountered and the check valve opening pressures are known, the minimum permissible spacing "X" of liquid outlets 32 beneath the gas escape valve may be calculated from the following formula:

$$L = \frac{P}{D} \times 12$$

Where $L$ = minimum permissible distance "X" in inches from uppermost liquid discharge aperture 32 to gas outlet valve seat.
$D$ = density of lightest fluid likely to be encountered in annulus outside of filter body, in lbs. per sq. in. per ft. This lightest density likely to be encountered is about 0.06 lb. per sq. in. per ft., the density of oil and gas froth. The heaviest fluid encountered is salt water which has a density of about .46 lb. per sq. in. per ft.

In a typical filter device which has proven extremely effective in very gassy wells, the various parts have the following proportions and characteristics:

1. Chamber diameter=4½".
2. Vertical distance X between seats of gas escape check valves 26 and uppermost liquid outlet aperture=38".
3. Vertical distance between check valves 26 and liquid level at which check valves are opened by hydrostatic pressure=4½".
4. Pressure at which check valves open=16 lb./sq. in.

When the production string 10 is for any reason to be removed from the well, it is desirable to provide means for draining the well fluid contained within the string from its lower end. For this purpose, it is customary to first lift the pump 11 from its seat 111, and preferably remove it completely from the string, so that the fluid may flow downwardly from within the string and past the pump seat. In the present device, however, check valve 34 within liquid outlet tube 25 prevents downward drainage of the fluid through that tube and the filter chamber. Consequently, I find it desirable to provide means for passing liquid from the liquid passage about valve 34 directly to the outside of the tool body, during removal of the production string and filter device from a well. For this purpose, head 20 of the filter body may contain an upwardly and outwardly extending passage 35a, formed the same as the seven gas escape passages 35 but communicating with liquid outlet passage 29 rather than the filter chamber. To effect such communication with liquid passage 29, a duct 45 may be formed in head 20 leading from that passage to the upwardly extending portion of passage 35a. Beneath the point of communication with duct 45, passage 35a may be closed off by a bottom plug 46, to prevent the upward flow of gases from the filter chamber into that passage. Above its point of communication with duct 45, passage 35a contains a valve seat 26b, on which a discharge controlling ball valve 26c seats downwardly. A second ball 26d may rest on the valve 26c, so that the opening pressure of valve 26c is greater than the opening pressures of gas outlet valves 26. As will be appreciated, upon elevation of pump 11 within the production string to a point at which liquid may flow downwardly within the string and past the pump, liquid flows downwardly within passage 29 and head 20, then through duct 45 and passage 35a, and past check valve 26c to the exterior of the filter body. In this manner, liquid is drained from the lower portion of the production string, to facilitate removal of the string from the well.

In the operation of the illustrated apparatus, the pump piston is reciprocated in the usual manner, to cause intermittent surges of liquid and gaseous well fluid upwardly into the filter chamber and toward the pump. Inlets 24 and 25 direct the incoming fluid in upwardly spiraling paths within the chamber, to cause a corresponding upwardly spiralling motion of the filter spheres. Passage of the fluid through the sphere mass separates the gases from the well liquid, and regularizes the flow of sand to the pump. The separated gases rise upwardly for discharge past check valves 26, which function in the manner previously discussed to maintain both a gas column in the chamber and a liquid seal at the liquid outlets. The relatively gas-free liquid flows into tube 25 and to the pump.

I claim:

1. A well pump filter device comprising a tubular body containing a vertically extending chamber and adapted to be carried beneath a well pump, means forming an inlet admitting well fluid into the chamber, filter means in the path of fluid flow through the chamber, said filter means comprising a mobile and vertically displaceable mass of interengaging filter particles, and a liquid outlet tube extending downwardly within the chamber at a location horizontally offset from the center thereof and containing a liquid outlet passage leading upwardly from the chamber to the pump.

2. A well pump filter device comprising a tubular body containing a vertically extending chamber and adapted to be carried beneath a well pump, means forming an inlet directing well fluid in a circular course within said chamber, filter means in the path of fluid flow through the chamber, and a liquid outlet tube extending downwardly within the chamber at a location horizontally offset from the center thereof and containing a liquid outlet passage leading upwardly from the chamber to the pump, the wall of said tube having aperture means leading into said passage at a side of the tube downstream with respect to the circular course of fluid flow, and said tube wall being imperforate along its opposite upstream side.

3. A well pump filter device comprising a tubular body containing a vertically extending chamber and adapted to be carried beneath a well pump, means forming an inlet admitting well fluid into the chamber, filter means in the path of fluid flow through the chamber, said filter means comprising a mobile and vertically displaceable mass of interengaging filter particles, and a liquid outlet tube extending downwardly within the chamber at a location horizontally offset from the center of the chamber and against a side wall thereof and containing a liquid outlet passage leading upwardly from the chamber to the pump.

4. A well pump filter device comprising a tubular body containing a vertically extending chamber and adapted to be carried beneath a well pump, means forming an inlet admitting liquid and gaseous well fluid into the chamber, a mobile and vertically displaceable mass of interengaging filter particles in the path of fluid flow through the chamber acting to separate gases from the well liquid, a liquid outlet tube extending downwardly within the chamber at a location horizontally offset from the center thereof and containing a liquid outlet passage leading upwardly from the chamber to the pump, and means forming an escape from the upper portion of the chamber to the exterior of the body.

5. A well pump filter device comprising a tubular body containing a vertically extending chamber and adapted to be carried beneath a well pump, means forming an inlet admitting liquid and gaseous well fluid into the chamber, a mobile and vertically displaceable mass of interengaging filter particles in the path of fluid flow through the chamber acting to separate gases from the well liquid and control sand flow through the chamber, and a liquid outlet tube extending downwardly within the chamber at a location horizontally offset from the center of the chamber and near a side wall thereof and containing a liquid outlet passage leading upwardly from the chamber to the pump, said chamber having upper gas outlet means, and check valve means preventing fluid inflow through said outlet means.

6. A well pump filter device comprising a tubular body containing a vertically extending chamber and adapted to be carried beneath a well pump, said body containing an inlet admitting liquid and gaseous well fluid into a lower portion of the chamber, a mobile and vertically displaceable mass of interengaging filter particles in the path of fluid flow through the chamber and acting to separate gases from the well liquid and control sand passage through the chamber, a liquid outlet tube projecting downwardly into said chamber at a location horizontally offset from its center and adjacent a side wall thereof, said tube containing a liquid discharge passage leading to said pump and communicating with the chamber at a predetermined location spaced below the top of the chamber, the wall of said tube being imperforate above said location, gas outlet means for separately discharging gases from an upper portion of the chamber above said location to the outside of the body, and check valve means preventing fluid inflow through said outlet means and resisting the gas discharge to maintain a body of gas in the chamber above the liquid, said check valve means being loaded sufficiently lightly to maintain the liquid level in the chamber at all times above said location.

7. A well pump filter device comprising a tubular body containing a vertically extending chamber and adapted to be carried beneath a well pump, means forming an inlet admitting well fluid into the chamber, filter means in the path of fluid flow through the chamber, a liquid outlet tube extending downwardly within the chamber and containing a liquid outlet passage leading upwardly from the chamber to the pump, and a check valve contained in said liquid outlet passage at a location beneath the top of said chamber and preventing fluid downflow through said passage.

8. A well pump filter device comprising a tubular body containing a vertically extending chamber and adapted to be carried beneath a well pump, means forming an inlet admitting liquid and gaseous well fluid into the chamber, means in the path of fluid flow through the chamber acting to separate gases from the well liquid, a liquid outlet tube extending downwardly within the chamber and containing a liquid outlet passage leading upwardly from the chamber to the pump, means forming an escape passage for discharging the separated gases from an upper portion of the chamber to the exterior of the body, and a check valve contained in said liquid outlet passage at a location beneath the top of said chamber and preventing fluid downflow through said passage.

9. A well pump filter device comprising a tubular body containing a vertically extending chamber and adapted to be carried beneath a well pump, means forming an inlet admitting liquid and gaseous well fluid into the chamber, a mobile and vertically displaceable mass of interengaging filter particles in the path of fluid flow through the chamber acting to separate gases from the well liquid and control sand flow through the chamber, a liquid outlet tube extending downwardly within the chamber and containing a liquid outlet passage leading upwardly from the chamber to the pump, said chamber having upper gas outlet means, check valve means preventing fluid inflow through said outlet means, and a check valve in said liquid outlet passage below the top of the chamber preventing fluid downflow through the passage.

10. A well pump filter device comprising a tubular body containing a vertically extending chamber and adapted to be carried beneath a well pump, means forming an inlet admitting well fluid into the chamber, filter means in the path of fluid flow through the chamber, said filter means comprising a mobile and vertically displaceable mass of interengaging filter particles, a liquid outlet tube extending downwardly within the chamber at a location horizontally offset from its center and adjacent a side wall thereof and containing a liquid outlet passage leading upwardly from the chamber to the pump, and a check valve in the body within said liquid outlet passage preventing fluid downflow through the passage.

11. A well pump filter device comprising a tubular body containing a vertically extending chamber and adapted to be carried beneath a well pump, said body containing an inlet directing liquid and gaseous well fluid in a circular and upwardly spiraling course within said chamber, a mobile and vertically displaceable mass of interengaging spherical filter particles in the path of fluid flow through the chamber and acting to separate gases from the well liquid and control sand passage through the chamber, a liquid outlet tube projecting downwardly into said chamber at a location horizontally offset from its center and adjacent a side wall thereof, said tube terminating downwardly in a closed lower end positioned above the particle mass in its condition of repose, said tube containing a liquid discharge passage leading to said pump and communicating with the chamber through aperture means in the tube wall positioned below the top of the chamber and at a side of the tube downstream with respect to the circular course of fluid flow, the wall of said tube being imperforate above said location and at its upstream side, gas outlet means for separately discharging gases from an upper portion of the chamber above said location to the outside of the body, check valve means preventing fluid inflow through said outlet means and resisting the gas discharge to maintain a body of gas in the chamber above the liquid, said check valve means being loaded sufficiently lightly to maintain the liquid level in the chamber at all times above said location, and a check valve in said liquid outlet tube at a location substantially directly above said aperture means and preventing downward fluid flow through the tube.

12. A well pump filter device comprising a tubular body containing a vertically extending chamber and adapted to be carried beneath a well pump, means forming an inlet directing well fluid in a circular course within said chamber, filter means in the path of fluid flow through the chamber, and a liquid outlet tube extending downwardly within the chamber at a location horizontally offset from the center thereof and containing a liquid outlet passage leading upwardly from the chamber to the pump, the wall of said tube having aperture means leading into said passage at a side of the tube downstream with respect to the circular course of fluid flow, said aperture means being formed in only an approximately 90 degree portion nearest the body wall of said downstream side of the tube.

13. A well pump filter device comprising a tubular body containing a vertically extending chamber and adapted to be carried beneath a well pump, means forming an inlet admitting liquid and gaseous well fluid into the chamber, means in the path of fluid flow through the chamber acting to separate gases from the well liquid, a liquid outlet tube extending downwardly within the chamber and containing a liquid discharge passage leading to the pump and communicating with the chamber through aperture means in the tube wall positioned below the top of the chamber, a check valve in said liquid outlet tube at a location substantially directly above said aperture means and below the top of said chamber preventing downward fluid flow through the tube, and means forming an escape passage for discharging the separated gases from an upper portion of the chamber to the exterior of the body.

14. A well pump filter device comprising a tubular body containing a vertically extending chamber and adapted for attachment to the lower end of a production string within which a well pump is seated, means forming an inlet admitting well fluid into the chamber, filter means in the path of fluid flow through the chamber, a liquid outlet tube extending downwardly within the chamber and containing a liquid outlet passage leading upwardly from the chamber to the pump, a check valve in said liquid outlet passage preventing fluid downflow therethrough, means forming a passage leading from a portion of said liquid outlet passage above said check valve to a location at the outside of said body and string and through which liquid from within the string may drain upon unseating of said pump, and check valve means resisting liquid flow from the body through said last mentioned passage until a predetermined pressure is reached in said outlet passage and preventing reverse flow therethrough.

15. A well pump filter device comprising a tubular body containing a vertically extending chamber and adapted to be carried at the lower end of a well pump, a wall carried by said body forming the bottom of said chamber and containing inlet apertures admitting well fluid into the chamber, filter means in the path of fluid flow through the chamber, a liquid outlet leading from said chamber upwardly to the pump, and a tube projecting downwardly from said body below said bottom wall of the chamber and containing openings in its side through which fluid enters the tube for passage upwardly through said apertures to the chamber, said openings being disposed at an angle directing the fluid in a circular and upwardly spiraling course of flow within the tube, said tube having a bottom opening through which materials from the fluid may fall downwardly.

16. A well pump filter device as recited in claim 15 in which said filter means comprise a mobile mass of interengageable filter particles displaceable upwardly within the chamber by the fluid flow, said bottom wall apertures being formed angularly to direct the fluid in a circular and upwardly spiraling course of flow within the chamber for effecting upwardly spiraling movement of the particles.

17. A well pump filter device as recited in claim 2, in which said filter means comprises a mobile and vertically displaceable mass of interengaging filter particles.

NORMAN C. WELLS.

References Cited in the file of this patent

UNITED STATES PATENTS

| Number | Name | Date |
|---|---|---|
| 1,192,145 | Williams | July 25, 1916 |
| 1,478,427 | Dulaney | Dec. 25, 1923 |
| 1,620,347 | Hawkins et al. | Mar. 8, 1927 |
| 1,628,900 | Nielsen | May 17, 1927 |
| 2,517,198 | Gilbert | Aug. 1, 1950 |
| 2,525,897 | Greene | Oct. 17, 1950 |